United States Patent [19]

Burinsky et al.

[11] 4,368,277

[45] Jan. 11, 1983

[54] POROUS OPEN-CELL FILLED REACTIVE MATERIAL

[76] Inventors: Stanislav V. Burinsky, ulitsa Bukharestskaya, 45, kv. 55; Leonard A. Volf, ulitsa Novosibirskaya, 18, kv. 45; Sasho P. Alexandrov, ulitsa Sadovaya, 54, kv. 511, all of Leningrad, U.S.S.R.

[21] Appl. No.: 145,971

[22] Filed: May 2, 1980

[30] Foreign Application Priority Data

Mar. 5, 1979 [SU] U.S.S.R. ................. 2762583

[51] Int. Cl.$^3$ ............................ C08J 9/00
[52] U.S. Cl. ............................ 521/84; 521/31; 521/32; 521/109; 521/134; 521/136; 521/137
[58] Field of Search ............ 521/106, 136, 137, 109, 521/32, 33, 84, 134

[56] References Cited

U.S. PATENT DOCUMENTS

| | | | |
|---|---|---|---|
| 2,763,624 | 9/1956 | Newell | 521/137 |
| 3,021,290 | 2/1962 | Gmitter et al. | 521/109 |
| 3,067,482 | 12/1962 | Hollowell | 521/137 |
| 3,256,218 | 6/1966 | Knox | 521/109 |
| 3,483,069 | 12/1969 | Carins et al. | 521/137 |
| 3,572,330 | 3/1971 | Gander | 521/109 |
| 3,737,398 | 6/1973 | Yamaguchi | 521/109 |
| 3,965,051 | 6/1976 | Markusch et al. | 521/109 |

*Primary Examiner*—Morton Foelak

*Attorney, Agent, or Firm*—Lilling & Greenspan

[57] ABSTRACT

A porous open-cell filled reactive material containing a polymeric matrix of foamed polyvinylformal or foamed polyurethane and a finely-divided oxidation-reduction reactive fiber as a filler in an amount of from 10 to 80% by mass of the final material. The oxidation-reduction properties of the fibers are ensured through the use of oxidation-reduction agents which are covalently bonded with the fiber. As the oxidation-reduction agents use is made of the following compounds: polyhydric phenols, anthraquinones, naphthoquinones, phenothiazine dyestuffs. The oxidation-reduction fibers also comprise metal-containing fibers based on polyvinyl alcohol, cellulose-regenerated fibers, acetate cellulose or polyacrylic polymers.

The porous materials according to the invention are produced by mixing solutions of a polymer, formalin, surfactants, polyhydric phenols or oligomeric products of condensation thereof with aldehydes, and a catalyst with finely-divided reactive fibers, foaming the reaction mass and maintaining it at a temperature within the range of from 20° to 100° C. for a period of from 1 hour to 50 hours. As the polyhydric phenols use is made of hydroquinone, pyrocatechol, pyrogallol, and as the oligomeric products of condensation of said phenols with aldehydes use is made of novolac resins based on hydroquinone or pyrocatechol with formaldehyde.

5 Claims, No Drawings

POROUS OPEN-CELL FILLED REACTIVE MATERIAL

FIELD OF THE INVENTION

The present invention relates to the art of production of materials having oxidation-reduction properties and, more specifically, to porous open-cell filled reactive materials. Such materials find ever-growing applications such as treatment of water employed for supply of power units of high and super-high parameters; preparation of deoxygenized high-purity water in modern electronic engineering, as well as in production of certain kinds of polymers; for conversion of some compounds from a lower valence state to a higher one; recovery of chromium from waste waters resulting from different processes; for a thorough purification of hydrocarbons from contaminating hydrogen sulphide; and purification of liquids from hydrogen peroxide.

BACKGROUND OF THE INVENTION

A specific group of reactive polymers possessing oxidation-reduction properties covers electron-exchangers or redox-polymers. These are polymers having macromolecules containing groups capable of entering reversible oxidation-reduction transformations.

Redox-polymers can be prepared by different methods such as polymerization, polycondensation, grafting of polymer chains, polymeranalogous transformations, as well as by way of saturation of ion-exchange resins (ionites) with chemically active compounds possessing reduction-oxidation properties.

Redox-polymers are divided into soluble and insoluble ones. The insoluble (cross-linked) polymers are advantageous in that they may be used as reagents in a chemical reaction and then filtered-off. These polymers can be charged into a column and employed for differential counter-current reactions; the final product is of sufficient purity, thus necessitating no additional purification.

Insoluble redox-polymers are produced mainly as irregularly shaped particles. The most optimal shape is spherical, since it offers minimal resistance to the liquid flow in columns.

The rate of reduction-oxidation reactions in redox-polymers is limited by diffusion of the reagents inside the granules. In insoluble redox-polymers the oxidation-reduction processes are slowed-down with increasing degree of the polymer cross-linking. At a relatively large size and comparatively small specific area, granules of redox-polymers swell only slightly due to the presence of reticulation, the rate of diffusion is decreased and, the rate of oxidation-reduction reactions is retarded.

Redox-polymers of macroporous structure can be obtained by introducing during the synthesis of redox-polymers, special additives (cross-agents) compatible with the starting monomers. Macroporous redox-polymers feature higher kinetic characteristics, though their oxidation-reduction capacity is substantially lower.

Another disadvantage of synthetic redox-polymers is their insufficient osmotic stability and low mechanical strength.

Losses of redox-polymers due to cracking of grains along existing cracks resulting from crushing the synthetic resin or from shrinkage thereof during thermal treatment, in certain cases, are as high as 15-17%.

To eliminate cracking of polymer particles, a more flexible structure of an electron-exchanger is required. All these disadvantages are absent with oxidation-reduction fibers. Indeed, there is a substantially more developed surface area of fibers enriched to a maximum possible extent with active functional groups in the superficial layer, a quick wetting ability and a high capillarity ensure a higher rate of processes occurring with fibrous materials as compared to granulated materials. Furthermore, the effective size of grains of granulated redox-polymers is about 0.40-0.60 mm, whereas the cross-sectional dimension of the majority of reactive fibrous materials is 20-30 times smaller and equal to 0.02-0.03 mm. Consequently, the path of diffusion of the reagents in fibrous materials is also 20-30 times shorter. This fact is the main reason for the substantially higher kinetics of reactive fibers as compared to granulated materials. It is also essential that the majority of modified fibers with reactive groupings possess a high porosity frequently attaining 100-200 $m^2/g$.

However, reduction-oxidation (redox) fibers, likewise non-woven fabrics based thereon, feature certain disadvantages, namely: when charged into a column, they become rather rapidly clogged thus sharply increasing the hydrodynamic resistance of the filtering bed.

To overcome this disadvantage, it is necessary that the filtering bed possess elasticity of flexible foamed plastics.

Currently known is a process for producing polyurethane foamed plastics containing ionic groups (cf. U.S. Pat. No. 3,988,268; Cl. 260-2.5, 1976). Amphoteric foamed plastics are produced from the reagents containing cationic and anionic groups. Thus, known in the art is the manufacture of polyurethane foamed plastic by reacting isocyanates such as 1-methyl-2,4-diisocyanate with organic compounds such as ricin polyglycol ether. The mixture is heated to a temperature of 170° C., maintained for three hours and then cooled to room temperature. The disadvantages of these materials reside, in particular, in that they have an insignificant content of ionic groups and are not suitable for the use, for this very reason, in processes of chemisorption and oxidation-reduction. They are intended solely for plant growing.

Also known in the art are ion-exchange foamed materials (cf. U.S. Pat. No. 3,867,319; 1975; U.S. Pat. No. 3,947,387; 1976; Cl. 260-2.5R) which are prepared by foaming a polymer produced in the presence of a volatile polar compound serving as a plasticizer for ionic groups. The polymer contains 0.4 to 10 mol.% of graft acid groups, especially sulpho groups. The material comprises sulphonated polystyrene. The product manufactured by this process has a low exchange capacity (the amount of ionic groups, in particular sulpho groups, is 0.2 to 20 mol. %) and a low mechanical strength. Furthermore, such materials are rigid and brittle.

U.S. Pat. No. 3,094,494; Cl. 260-2.1, 1963, teaches ion-exchange cellular materials consisting of a foamed polyurethane serving as a polymeric matrix and a filler, namely a synthetic ion-exchange resin, employed in an amount of from 0.5 to 160 parts by weight per 100 parts by weight of the polymeric matrix. To produce such materials, 100 parts by weight of polypropylene glycol oligomer (prepared by heating 2 parts by weight of a mixture of 100 g of polypropylene glycol with the molecular mass of 2,000 and 35 parts by weight of toluenediisocyanate/isomeric mixture of 80:20/) are added with 67 parts by weight of a finely divided ion-exchange resin based on sulphonic acid (sulphonated styrene and divinylbenzene in its sodium form) and intermixed form a uniform composition, whereafter the resulting homogeneous mass has added to it a mixture of 2.4 parts by weight of water, 1 part by weight of methylmorpholine, 0.6 part of dimethylpolysiloxane (silicone oil) and is intermixed until foaming occurs. The materials produced by this process are flexible, elastic, and gas- and liquid-permeable. However, under the effect of working solutions the finely-divided ion-exchange resin is washed out of the material, thus substantially affecting its exchange capacity during operation and reducing the life time of such materials. Furthermore, the material is characterized by relatively low kinetic characteristics.

Due to these features it is inefficient to use such ion-exchange cellular materials and resin-filled cellular foams for alleviation of such problems as protection of environment from pollution. Due to low values of exchange capacity, hydrophobic character and insufficient rate of exchange and oxidation-reduction reactions, their use cannot ensure purification of waste waters from harmful substances to permissible concentrations. Furthermore, the possibility of varying properties of the materials for the purpose of widening the scope of their applications is hindered or totally excluded.

SUMMARY OF THE INVENTION

It is an object of the present invention to provide a reactive material possessing high rates of oxidation-reduction, increased osmotic stability, mechanical strength and flexo-elastic properties.

It is another object of the present invention to provide materials retaining shape- and mass- stability during extended use.

It is still another object of the present invention to provide materials having a wide range of application and suitable for electron exchange in strongly diluted solutions.

These and other objects of the present invention are accomplished by providing a porous open-cell filled reactive material comprising a polymeric matrix and a reactive filler, wherein, according to the present invention, the polymeric matrix can be made of foamed polyvinylformal or foamed polyurethane, and the reactive filler can be made of finely divided reactive oxidation-reduction fibers in an amount of from 10 to 80% by mass of the final material.

It is preferable that the content of reactive fibers be essentially of from 50 to 70% by mass of the final material. The material, in this case, features an high reduction-oxidation capacity, an increased mechanical strength, osmotic stability, and flexo-elastic properties.

The oxidation-reduction fibers can be made of polyvinylalcohol fibers with covalently bonded polyhydric phenols such as pyrocatechol, pyrogallol and hydroquinone in the form of graft chains of polymethylenepyrocatechol, polymethylenepyrogallol and polymethylenehydroquinone. Furthermore, use is made of polyvinylalcohol fibers whose structure is incorporated with oligomeric products of condensation of polyhydric phenols with formaldehyde, in particular pyrocatecholformaldehyde, pyrogallolformaldehyde and hydroquinoneformaldehyde condensation products. Polyvinylalcohol fibers have a high rate of oxidation-reduction. Redox polymers based on these fibers have a capacity of 5–6 mg-equiv/g.

The oxidation-reduction fibers can also be made of polyvinylalcohol fibers with covalently bonded naphthoquinone, anthraquinone and aminophenol.

Use is made of polyvinylalcohol fibers with phenothiazine dyestuffs which are covalently bonded with the fibers and capable of oxidation-reduction transformations.

The oxidation-reduction fibers can also be made of polyvinylalcohol fibers with sulphohydryl groups.

Use is made of metal-containing fibers based on modified polyvinyl alcohol, such as copper-, iron- and bismuth-containing fibers. Ions of these metals, when passing from the higher valence state to the lower one participate in oxidation-reduction processes. The capacity of such fibers reaches 4–5 mg-equivalent/g. They demonstrate a high effectiveness in oxygen recovery from water.

The oxidation-reduction fibers can also be used cellulose-regenerated and acetylcellulose fibers with covalently bonded polyhydric phenols (pyrocatechol, pyrogallol, hydroquinone), naphtho- and anthraquinones, aminophenols and oligomeric products of condensation with aldehydes. Also used are cellulose-regenerated fibers with phenothiazine dyestuffs and cellulose-regenerated fibers with sulphohydryl groups.

Also employed are metal-containing (copper, bismuth, tin, iron) fibers based on ion-exchange cellulose-regenerated and acetate cellulose fibers.

The oxidation-reduction fibers can also be polyacrylonitrile fibers with covalently bonded pyrocatechol, pyrogallol, hydroquinone or oligomeric products of condensation with an aldehyde.

Among metal-containing polyacrylic fibers use is made of copper-, bismuth-, iron- and tin-containing fibers.

A process for producing a porous open-cell filled reactive material comprises mixing a polymer solution, formalin, a surfactant and an acid curing catalyst with finely divided fibers; foaming the reaction mass and maintaining the temperature from 20° to 100° C., for a period of time ranging from 1 to 50 hours. In accordance with the present invention, the reaction mass during mixing and foaming is contacted with 0.2 to 30% of the polymer mass of polyhydric phenols or oligomeric products of condensation of these phenols with aldehydes.

The polyhydric phenols can be hydroquinone, pyrocatechol, pyrogallol or a mixture thereof with resorcinol. The oligomeric products of condensation of said phenols with aldehydes can be novolac resins based on hydroquinone or pyrocatechol with formaldehyde.

During the curing process, in a thermostatted vessel, several competing reactions proceed, namely: substitution of free hydroxy groups of polyvinyl alcohol by formaldehyde according to the scheme of an acetalization reaction; interaction of formaldehyde with polyphenols or with their oligomeric products with the formation of mono-, di- and polymethylol derivatives of polyphenols and their reaction with free hydroxy groups of polyvinyl alcohol units; propagation of the graft chain of oligomethylenepolyphenols; further condensation of oligomers of methylenepolyphenols with the formation of insoluble products. In this manner there occurs a covalent addition of redox groups to the polymeric matrix.

The introduction, in hydroquinone and pyrocatechol redoxites, of resorcinol (in an amount of from 0.07 to 0.09% by weight of the basic polyphenol) substantially increases the chemical resistance of redoxites.

Porous open-cell filled reactive materials possess a full range of valuable properties. They combine high kinetic characteristics, osmotic stability and mechanical strength of reactive fibers with flexo-elastic properties of foamed plastics. An important advantage of porous open-cell filled reactive materials over granulated materials resides in a higher rate of oxidation-reduction transformations. This is due to the fact that the effective size of redoxite granules is about 20-30 times higher than the fiber diameter. Furthermore, active groups of fibers are concentrated about their surface. The path of diffusion of the working solutions of oxidizing (reducing) agents to active groups of redox fibers is substantially smaller and the rate of reduction-oxidation processes on porous filled reactive materials is higher by approximately 5 times as compared to granulated materials.

Porous filled reactive materials do not substantially break under considerable mechanical loads and sharp variations of the ionic strength of solutions.

Porous filled reactive materials feature elasticity, flexibility, unbreakability under strains and shocks. These materials are hydrophilic, and have a well-developed network of communicating capillaries and pores. In the dry state the thin-pore condensation structure of the material disappears and converts to the cryptocondensational structure. Only porosity obtained upon foaming as a result of incorporation of a fibrous filler is retained. In the dry state the material is rigid. It can be subjected to various kinds of machining (sawing, cutting, shaping) to impart the required size and shape to the articles. The presence of the system of relatively coarse-size open pores and communicating capillaries substantially facilitates impregnation of the material with working solutions. Thin pore walls are rapidly wetted and swollen, so that the cryptocondensational structure is again expanded and occupies the volume it had in the wet condition prior to drying. In the swollen state the material features a high elasticity and capability of withstanding considerable reversible deformations. Owing to the fact that water is a plasticizer for foamed polyvinylformal, even lengthy exploitation of a porous reactive material does not result in loss of its elasticity.

In porous filled reactive materials the cell size is substantially smaller than the fiber length, wherefore the fibers are strongly bonded within the polymeric matrix bulk. During exploitation, porous filled reactive materials feature a high mass stability due to their increased osmotic stability and mechanical strength.

Porous reactive materials can be manufactured using the conventional equipment employed for the production of foamed polyvinylformal and foamed polyurethanes.

Oxidation-reduction processes with these materials can be carried out using the conventional procedures in columns, filter-presses and other equipment without bringing any substantial structural changes in the basic equipment employed in these processes.

DETAILED DESCRIPTION OF THE INVENTION

To produce an open-cell porous filled reactive material based on foamed polyvinylformal, an aqueous solution of polyvinyl alcohol (use is made of polyvinyl alcohol with a molecular mass of from 30,000 to 150,000) is foamed in the presence of a surfactant by means of a mechanical stirrer. During the foaming process formaldehyde is added in the form of a 37% aqueous solution; also introduced is a aqueous solution of sodium chloride. Foaming is conducted until the degree of foaming is equal to 3-10. For this purpose use can be made of impellers rotating at a speed within the range of from 500 to 10,000 r.p.m. The foaming agent can be ionic and non-ionic surfactants such as: alkylsulphates, alkylsulphonates, alkylarylsulphonates, amines with different degrees of substitution, polyoxyethylene esters of fatty acids and other surfactants.

The catalysts for the reaction of condensational structure-formation of foamed polyvinylformal can be mineral acids such as hydrochloric acid, phosphoric acid, nitric acid and sulphuric acid. The catalyst should be preferably added one or several minutes prior to completion of the foaming process.

The introduction of a fibrous filler into the reaction mass is effected in a screw mixer or in the same vessel where foaming has been conducted at low speeds of rotation of the stirrer (100 to 300 r.p.m.). The fiber length can be varied from 1-2 mm to 50-60 mm, preferably from 3 to 8 mm.

The structuralization (acetalization) process of polyvinyl alcohol can be carried out at a temperature within the range of from 20 to 100° C. In doing so the acetalization time is varied from 1 hour to 50 hours. The viscosity of the system is gradually increased, thus additionally increasing the foam stability. During maturation, fine particles of the new phase are liberated from the solution thus causing the formation of a condensational structure simultaneously with curing of the foam. During the process of condensational structuralization the new phase, particles (polyvinylformal) are deposited on the surface of the fibers. The particles become bonded between each other and form a three-dimensional network including fibers as well. Since the fiber length exceeds (usually by 1-2 hundred times) the pore size, the fibers are incorporated in several cells simultaneously. They pierce the cell walls or are disposed inside the walls per se. Therefore, a peculiar reinforcement of the system takes place which considerably increases the mechanical strength of the porous material. In doing so, no noticeable loss of elasticity and flexibility of the polymeric matrix (base) occurs, since the fibers per se have good flexibility.

After separation of the liquid phase which is repeatedly used for the preparation of the reaction mixture, the resulting materials are thoroughly washed with softened water to remove excess amounts of the acid, salt and formalin, whereafter drying of the material is conducted at a temperature within the range of from 70° to 90° C.

During the manufacture of the porous open-cell reactive material, the degree of acetalization of polyvinyl alcohol is brought to a value ensuring the formation, in the walls of the foam bubbles, of a condensational structure. For this reason, upon drying, the thin-pore condensational structure disappears while being converted to a cryptocondensational structure. Only the coarser porosity obtained upon foaming and as a result of incorporation of the fibrous filler is retained. In a dry state the material is rigid. It can be subjected to all kinds of machining to impart to the material the required dimensions and shape. The presence, in the material, of a developed system of open pores and capillaries substantially facilitates impregnation of the materials with aqueous solutions. Thin walls of pores get quickly wetted and swollen, the cryptocondensational structure is again expanded and occupies that volume that it had prior to drying, i.e. in the wet condition.

In the swollen state where foamed polyvinylformal comprises a complex fibro-porous system consisting of the finest structural elements, the material manifests very high elasticity. It is capable of withstanding very high reversible deformations under stresses. Since water is a plasticising agent for foamed polyvinylformal, even lengthy use of the porous reactive material does not result in losses of its elasticity.

In the manufacture of porous reactive materials having oxidation-reduction properties, into the reaction mass during mixing and foaming there are additionally incorporated polyhydric phenols capable of oxidation-reduction transformations or oligomeric products of condensation of said phenols with aldehydes. Use is made mainly of pyrocatechol, pyrogallol, hydroquinone or preliminary prepared pyrocatechol-formaldehyde, hydroquinone-formaldehyde, pyrocatechol-resorcinol-formaldehyde and hydroquinone-resorcinol-formaldehyde oligomers with a molecular mass of from 600 to 800. Aqueous solutions are prepared with a concentration of from 5 to 15% by mass. Their incorporation into the reaction mass is effected in small portions under vigorous stirring.

Since the reaction mixture contains formaldehyde and acid, during residence in a thermostatted vessel several competing reactions occur, namely: substitution of free hydroxy groups of a copolymer of vinyl alcohol and vinylformal according to the acetalization reaction; interaction of formaldehyde with polyphenols or with their oligomeric products with the formation of mono-, di- and poly- methylol derivatives of polyphenols and their reaction with free hydroxy groups of polyvinyl alcohol units; propagation of the graft chain of oligomethylenepolyphenols; further condensation of oligomers of methylenepolyphenols with the formation of insoluble products. In this manner a covalent addition of redox groups to the polymeric matrix takes place.

The resulting materials are washed with deoxygenized water and dried at a temperature within the range of from 60° to 80° C.

The process of manufacturing of a porous reactive material on the basis of an elastic foamed polyurethane involves stages of mixing the polyester with cut redox fibers with diisocyanate dispersed therein, blending in a high-speed mixer, mixing with a catalyst and a small amount of water, followed by curing the foamed material.

To produce a porous open-cell filled reactive material based on an elastic foamed polyurethane, the starting components are mixed in a mixer (one-stage method) or a polyester-isocyanate is first prepared from a polyester and diisocyanate taken in an excessive amount, whereafter it is mixed with the other components (two-stage method). In the one-stage method the reaction proceeds at a high rate, in the two-stage method—substantially slower. In the last case there is an opportunity of adjusting the material density.

Use is made of polyesters (products of condensation of polyfunctional acids and polyfunctional alcohols), polyethers (products of condensation of alkene oxides with difunctional alcohols) and nitrogen-containing polyfunctional alcohols or polyethers (products of condensation of alkene oxides with polyfunctional amines such as ethylenediamine, diethylenetriamine and the like).

The catalysts for the reaction of interaction of diisocyanate with hydroxy groups of polyesters or polyhydric alcohols controlling the reaction rate and the process duration can be phenolates methyl- and ethyl-morpholines, pyridine, dimethylaniline.

As emulsifying agents sodium salts of sulphonic acids and other surface-active compounds are used. The plasticizers can be dibutylphthalate and tricresylphosphate.

Density of the foamed mixture and the number of cross-links is adjusted by varying the amount of water and diisocyanate added to the polyester. The greater the amount of water and diisocyanate, the smaller the apparent density of the material and the higher the number of cross-linking bridges between chains, while the latter increases the rigidity of the materials.

The curing of the porous reactive material is completed within several hours.

The reactivity of the resulting materials is evaluated under laboratory conditions in the following manner.

To determine oxidation-reduction capacity, a weighed portion of an air-dry redoxite in an amount of from 0.3 to 0.5 g is placed into a flat-bottom 200–250 ml flask containing exactly 100 ml of a 2 N solution of ferric chloride in a 0.2 N sulphuric acid. The solution temperature is kept at 55° C. The flask is periodically shaken. After 10 minutes the redoxite is squeezed and withdrawn from the flask, while the solution of the oxidizing agent is subjected to analysis for the content of the resulting bivalent iron.

To this end, a sample of the solution is taken by means of a 25 ml pipette, transferred to a 100 ml flask, added with 20 ml of a 2 N sulphuric acid and 4 drops of diphenylamine indicator (which is prepared by dissolution of 0.2 g of diphenylamine in 100 ml of concentrated sulphuric acid). After stirring, the flask contents are titrated with a 0.1 N solution of potassium bichromate until a dark-green color appears. Then 5 ml of a 25% solution of orthophosphoric acid are added to the solution so as to bind ions of ferric iron to a complex and thus eliminate oxidation to diphenylamine. Further titration is effected until the solution acquires a violet-blue color.

The oxidation-reduction capacity (ORC) of a redoxite is calculated by the formula:

$$ORC = (V \cdot N \cdot 4)/q$$

wherein

V is the amount of the solution of bichromate consumed for titration, ml;

N—normality of the solution of bichromate;

q—weighed portion of the redoxite, g.

The coefficient of utilization of redox-groups which characterizes the rate of electron exchange comprises a ratio of the oxidation-reduction capacity for 10 minutes of contact between the material and the solution to the total oxidation-reduction capacity.

To determine the percentage of decreasing material capacity, the materials are subjected to repeated cycles of oxidation-reduction.

The filled reactive materials are substantially (by 2–3 times) superior over the conventional redox-materials in terms of their kinetic characteristics, osmotic stability and mechanical strength.

The materials feature flexo-elastic properties and are capable of withstanding very high reversible deformations.

Porous fiber-filled reactive materials, unlike the prior art polymeric materials, do not substantially break down under considerable mechanical loads and sharp variations of the ionic strength of solutions.

In the manufacture of porous filled reactive materials use can be made of any types of reactive fibers with oxidation-reduction properties. The materials have a wide range of applications and are suitable for operation with solutions having a low concentration of the solute.

During operation, the porous reactive materials according to the present invention, owing to their high osmotic stability and mechanical strength demonstrate a high mass stability.

Oxidation-reduction and sorptional processes using the materials of the present invention can be effected following conventional procedure in columns, filter-presses, without substantial structural variations to the design of the equipment employed in these processes.

For a better understanding of the present invention some following specific Examples are given hereinbelow by way of illustration.

EXAMPLE 1

A porous reactive material containing 20% foamed polyvinylformal and 80% polyvinylalcohol oxidation-reduction fibers with graft polymethylene-pyrogallol chains is prepared.

100 ml of a 10% solution of polyvinyl alcohol are foamed in an open vessel in the presence of an emulsifying agent, i.e. an alkylsulphate, by means of a mechanical agitator under atmospheric pressure for 10–15 minutes. Afterwards, still under stirring, 10 ml of a 37% solution of formaldehyde are added to the foam. 1–2 minutes prior to the end of foaming there is added the reaction catalyst for condensational structuralization. The catalyst is 10 ml of concentrated hydrochloric acid. An oxidation-reduction fiber produced by grafting methylenepyrogallol to polyvinylalcohol fibers is added to the uniform foam while stirring, in the amount of 40 g (80% by mass of the final material). The fiber is cut to lengths of 5–8 mm. The resulting mass is poured into a mold and kept until curing in a thermostatted vessel at a temperature of 70° C. for 60 minutes. Afterwards to ensure a fuller degree of the process completion, it is kept for 24 hours at room temperature. The thus-prepared material, after separation of the liquid phase, is washed to remove the unreacted components and dried.

The resulting material comprises a redoxite with an oxidation-reduction capacity of 4.0 mg-equiv/g. The coefficient of utilization of redox groups (the ratio of the static capacity to the full capacity) for 10 minutes is 75%. The apparent density of the material is equal to 150–160 kg/m$^3$ and remains unchanged during operation.

After 10 cycles of operation, the oxidation-reduction capacity is lowered by 12% as compared to the initial value.

EXAMPLE 2

Porous reactive material containing 30% foamed polyvinylformal and 70% polyvinylalcohol reduction-oxidation fibers with graft polymethylenepyrocatechol chains is prepared.

The procedure of manufacture is similar to that described in Example 1, except that instead of 40 g of fibers there are introduced 23.3 g of polyvinylalcohol fibers with graft polymethylenepyrocatechol (70% by mass of the final material).

The resulting material comprises a redoxite with an oxidation-reduction capacity of 3.5 mg-equiv/g. The coefficient of utilization of redox-groups for 10 minutes is 76%. After 10 cycles of operation the capacity is lowered by 15% as compared to the initial value. The apparent density of the material amounting to 140–150 kg/m$^3$ remains unchanged during operation.

EXAMPLE 3

Porous reactive material containing 30% foamed polyvinylformal and 70% of polyvinylalcohol oxidation-reduction fibers with graft polymethylenepyrogallol chains is prepared.

The production procedure is similar to that described in Example 1, except that instead of 40 g of fibers, use is made of 23.3 g (70% by mass) of polyvinylalcohol fibers with graft polymethylenepyrogallol and, upon foaming, the reaction mass is additionally incorporated with 30% by mass (of polyvinylalcohol fibers) of pyrogallol in the form of a 10% aqueous solution.

The thus-prepared material comprises a redoxite with an oxidation-reduction capacity of 3.9–4.2 mg-equiv/g. The coefficient of utilization of redox groups is 79% for 10 minutes. After 10 cycles of operation the capacity is lowered by 17% as compared to the starting value. The apparent density equal to 150 kg/m$^3$ remains unchanged during operation.

EXAMPLE 4

Porous reactive material containing 20% foamed polyvinylformal and 80% polyvinylalcohol oxidation-reduction fibers with graft polymethylenehydroquinone chains is prepared.

The procedure of manufacture is similar to that described in Example 1, except that instead of 40 g of the fiber according to Example 1, use is made of 40 g of polyvinylalcohol fibers with graft polymethylenehydroquinone and, upon foaming, 4.0 g (0.4% by mass) of hydroquinone in the form of a 10% aqueous solution are added to the reaction mass.

The resulting mass is kept for curing in a thermostatted vessel at a temperature of 60° C. for 90 minutes.

The thus-produced material comprises a redoxite with an oxidation-reduction capacity of 3.2 mg-equiv/g. The coefficient of utilization of redox groups for 10 minutes is equal to 74%. After ten cycles of operation, the oxidation-reduction capacity is decreased by 19% as compared to the initial value. The apparent density of the material is equal to 130–135 kg/m$^3$ and remains unchanged during operation.

EXAMPLE 5

Porous reactive material containing 30% foamed polyvinylformal and 70% polyvinylalcohol oxidation-reduction fibers with graft polymethylenepyrocatechol chains is prepared.

The procedure of manufacture is similar to that described in Example 1, except that instead of 40 g of the fiber there are added 23.3 g (70% by mass) of polyvinylalcohol fiber with graft polymethylenepyrocatechol. Upon foaming, the reaction mass is added with 0.5 g (5% by mass of polyvinyl alcohol) of pyrocatechol in the form of a 10% aqueous solution. The resulting mass is kept for curing in a thermostated vessel at a temperature of 70° C. for 60 minutes.

The resulting material comprises a redoxite with an oxidation-reduction capacity of 3.9–4.0 mg-equiv/g. The coefficient of utilization of redox groups for 10 minutes is 82%. After 10 cycles the capacity is reduced by 18% as compared to the initial value. The apparent density of the material is equal to 130–140 kg/m$^3$ and remains unchanged during operation.

EXAMPLE 6

Porous reactive material containing 30% foamed polyvinylformal and 70% polyacrylonitrile oxidation-reduction fibers with graft polymethylenepyrocatechol chains is prepared.

The production procedure is similar to that described in Example 1, except that instead of 40 g of the fiber there are added 40% (80% by mass) of polyacrylonitrile fiber with graft polymethylenepyrocatechol and, upon foaming, the reaction mixture is added with 1 g (10% by mass of polyvinyl alcohol) of pyrocatechol in the form of a 10% aqueous solution. The curing temperature is 50° C., duration of curing—90 minutes.

The resulting material comprises a redoxite with an oxidation-reduction capacity of 3.5–4.0 mg-equiv/g. The coefficient of utilization of redox groups for 10 minutes is 81%. After 10 cycles of operation the oxidation-reduction capacity is decreased by 22% as compared to the initial value. The apparent density of the material is equal to 130–140 kg/m$^3$ and remains unchanged during operation.

EXAMPLE 7

Porous reactive material containing 40% foamed polyvinylformal and 60% polyacrylonitrile oxidation-reduction fibers with graft polyethylenepyrogallol chains is prepared.

The process of manufacture is similar to that of Example 1, except that instead of 70 g of the fiber there are added 15 g (60% by mass) of polyacrylonitrile fiber with graft polymethylenepyrogallol; upon foaming, the reaction mass is added with 1.5 g of (15% by mass of polyvinyl alcohol) pyrogallol in the form of a 10% aqueous solution. Curing is carried out at a temperature of 80° C. for 60 minutes. The reaction catalyst, instead of hydrochloric acid, is orthophosphoric acid in the amount of 2.7% per 100 g of absolutely dry solids of the composition.

The resulting material comprises a redoxite with an oxidation-reduction capacity of 4.1–4.3 mg-equiv/g. The coefficient of utilization of redox groups for 10 minutes is 80%. After ten cycles of operation the capacity is decreased by 12% as compared to the initial value. The apparent density of the material is equal to 150 kg/m$^3$ and remains unchanged during operation.

EXAMPLE 8

Porous reactive material containing 30% foamed polyvinylformal and 70% cellulose-regenerated oxidation-reduction fibers with graft polymethylenepyrocatechol chains is prepared.

The process of manufacture is similar to that of Example 1, except that instead of 40 g of the fiber there are introduced 23.3 g (70% by mass) of cellulose-regenerated fiber with graft polymethylenepyrocatechol. The reaction mass is added during foaming with 2 g (20% by mass of polyvinyl alcohol) of pyrocatechol in the form of a 10% aqueous solution. Curing is effected at a temperature of 50° C. for two hours.

The thus-produced material is a redoxite with an oxidation-reduction capacity of 4.3 mg-equiv/g. The coefficient of utilization of redox groups for 10 minutes is 75%. After 10 cycles of operation the capacity is decreased by 19% as compared to the starting value. The apparent density of the material amounting to 130 kg/m$^3$ remains unchanged during operation.

EXAMPLE 9

Porous reactive material containing 30% foamed polyvinylformal and 70% cellulose-regenerated oxidation-reduction fibers with graft polymethylenehydroquinone chains is prepared.

The process of manufacture is similar to that described in Example 1, except that instead of 40 g of fibers there are added 23.3 g (70% by mass) of cellulose-regenerated fibers with graft polymethylenehydroquinone and, upon foaming, into the reaction mixture there are introduced 2.5 g (25% by mass of polyvinyl alcohol) of hydroquinone in the form of a 10% aqueous solution. Curing is carried out at a temperature of 40° C. for 8 hours.

The thus-produced material is a redoxite with an oxidation-reduction capacity of 4.9 mg-equiv/g. The coefficient of utilization of redox groups for 10 minutes is 81%. The aparent density of the material is equal to 120 kg/m$^3$ and remains unchanged during operation.

EXAMPLE 10

Porous reactive material containing 30% foamed polyvinylformal and 70% acetatecellulose oxidation-reduction fibers with graft polymethylenepyrocatechol chains is prepared.

The process of manufacture is similar to that described in Example 1, except that instead of 40 g of the fibers there are added 23.3 g (70% by mass) of acetatecellulose fiber with graft polymethylenepyrocatechol and, upon foaming, into the reaction mixture there are introduced 3 g (30% by mass of polyvinyl alcohol) of pyrocatechol in the form of a 10% aqueous solution. Curing is conducted at a temperature of 30° C. for 15 hours.

The resulting material comprises a redoxite with an oxidation-reduction capacity of 2.9 mg-equiv/g. The coefficient of utilization of redox groups for 10 minutes is 74%. After 10 cycles of operation the capacity is reduced by 21% as compared to the starting value. The apparent density of the material is equal to 100 kg/m$^3$ and remains unchanged during operation.

EXAMPLE 11

Porous reactive material containing 50% foamed polyvinylformal and 50% polyvinylalcohol oxidation-reduction fibers containing anthraquinone is prepared.

The procedure of manufacture is similar to that of Example 1, except that instead of 40 g of the fiber there are added 10 g (50% by mass) of polyvinylalcohol fiber containing anthraquinone (in particular, 2-hydroxyanthraquinone). Curing is carried out at a temperature of 20° C. for 50 hours.

The thus-produced material is a redoxite with an oxidation-reduction capacity of 1.3–1.4 mg-equiv/g. The apparent density of the material amounting to 110 kg/m$^3$ remains unchanged during operation. After 10 cycles of operation the capacity is reduced by 18% as compared to the initial value.

EXAMPLE 12

Porous reactive material containing 30% foamed polyvinylformal and 70% tetranaphthohydroquinone-containing polyacrylonitrile oxidation-reduction fibers.

The production process is similar to that described in Example 1, except that instead of 40 g of fibers there are added 23.3 g (70% by mass) of polyvinylalcohol fibers containing tetranaphthahydroquinone. Also added are 0.4 g (4% by mass of polyvinyl alcohol) of tetranaphthahydroquinone in the form of a 10% aqueous solution. Curing is carried out at a temperature of 20° C. for 50 hours.

The thus-produced material comprises a redoxite with an oxidation-reduction capacity of 3.5 mg-equiv/g. The coefficient of utilization of redox groups for 10 minutes is 75%. The apparent density of the material is equal to 150 kg/m$^3$ and remains unchanged during operation.

EXAMPLE 13

Porous reactive material containing 30% foamed polyvinylformal and 70% polyvinylalcohol oxidation-reduction fibers modified with pyrocatechol-formaldehyde novolac oligomer is prepared.

The production process is similar to that described in Example 1, except that instead of 40 g of the fiber there are added 23.3 g (70% by mass) of polyvinylalcohol fiber modified with pyrocatechol-formaldehyde novolac oligomer. Also added is 0.2 g (2% by mass of polyvinyl alcohol) of pyrocatecholoformaldehyde novolac oligomer in the form of a 10% aqueous solution. Curing is effected at a temperature of 90° C. for one hour.

The thus-produced material comprises a redoxite with an oxidation-reduction capacity of 5.0 mg-equiv/g. The coefficient of utilization of redox groups is 81% for 10 minutes. After ten cycles of operation the capacity is lowered by 14% as compared to the starting value. The apparent density of the material is equal to 190 kg/m$^3$ and remains unchanged during operation.

EXAMPLE 14

Porous reactive material containing 70% foamed polyvinylformal and 30% polyacrylonitrile oxidation-reduction modified by pyrocatechol-formaldehyde oligomer is produced.

The procedure of manufacture is similar to that described in Example 1, except that instead of 40 g of the fiber there are used 4.4 g (30% by mass) of polyacrylonitrile fiber modified with pyrocatechol-formaldehyde oligomer. The curing catalyst, instead of concentrated hydrochloric acid, is concentrated sulphuric acid in the amount of 1.9% per 100 g of absolutely dry solids of the composition.

The resulting material is a redoxite with an oxidation-reduction capacity equal to 1.1 mg-equiv/g. The coefficient of utilization of redox groups for 10 minutes is 84%. After 10 cycles of operation the capacity is decreased by 12% as compared to the initial value. The apparent density of the material equal to 190–200 kg/m$^3$ remains unchanged during operation.

EXAMPLE 15

Porous reactive material containing 30% foamed polyvinylformal and 70% cellulose-regenerated oxidation-reduction fibers modified with pyrocatechol-formaldehyde oligomer is prepared.

The procedure of manufacture is similar to that described in Example 1 except that instead of 40 g of the fiber there are added 23.3 g (70% by mass) of cellulose-regenerated fibers modified with pyrocatechol-formaldehyde oligomer. Also added is 0.4 g (4% by mass of polyvinyl alcohol) of pyrocatechol-formaldehyde oligomer in the form of a 10% aqueous solution and 4% by mass (0.4 g) of resorcinol in the form of a 10% aqueous solution.

The thus-produced material comprises a redoxite with an oxidation-reduction capacity of 4.4 mg-equiv/g. The coefficient of utilization of redox groups for 10 minutes is 72%. After 10 cycles the capacity is decreased by 7.2% as compared to the initial value. The apparent density of the material amounting to 150 kg/m$^3$ remains unchanged during operation.

EXAMPLE 16

Porous reactive material containing 30% of foamed polyvinyl formal and 70% of cellulose-regenerated oxidation-reduction fibers modified with hydroquinone-formaldehyde oligomer is prepared.

The procedure of manufacture is similar to that described in Example 1, except that instead of 40 g of the fiber there are added 23.3 g (70% by mass) of cellulose-regenerated fibers modified with hydroquinone-formaldehyde oligomer. Also added to the reaction mass upon foaming is 0.5 g (5% by mass) of a hydroquinone-formaldehyde oligomer in the form of a 10% aqueous solution.

The thus-produced material comprises a redoxite with an oxidation-reduction capacity of 3.8 mg-equiv/g. The coefficient of utilization of redox groups for 10 minutes is 84%. After 10 cycles of operation the capacity is lowered by 13% as compared to the starting value. The apparent density of the material is equal to 120 kg/m$^3$ and remains unchanged during operation.

EXAMPLE 17

Porous reactive material containing 60% foamed polyvinylformal and 40% acetatecellulose oxidation-reduction fibers with graft polymethylenenaphthoquinone is prepared.

The procedure of manufacture is similar to that described in Example 1, except that instead of 40 g of the fiber there are added 8 g (40% by mass) of acetate-cellulose fiber with graft polymethylenenaphthoquinone. Curing is carried out for 50 hours at a temperature of 20° C.

The thus-produced material comprises a redoxite with an oxidation-reduction capacity of 2.4 mg-equiv/g. The apparent density of the material is equal to 110 kg/m$^3$ and remains unchanged during operation.

EXAMPLE 18

Porous reactive material containing 50% foamed polyvinylformal and 50% polyvinylalcohol oxidation-reduction fibers with phenothiazine dyestuff is prepared.

The procedure of manufacture is similar to that of Example 1, except that instead of 40 g of the fiber there are added 10 g (50% by pass) of polyvinylalcohol fibers containing phenothiazine dyestuff, in particular toluidine blue. Also added are 3% by mass of pyrocatechol in the form of a 10% aqueous solution.

The thus-produced material is a redoxite with an oxidation-reduction capacity of 2.7 mg-equiv/g. The coefficient of utilization of redox groups for 10 minutes is 69%. The apparent density of the material is equal to 90 kg/m³ and remains unchanged during operation.

EXAMPLE 19

Porous reactive material containing 40% foamed polyvinylformal and 60% polyacrylonitrile oxidation-reduction fibers with phenothiazine dyestuff.

The production procedure is similar to that of Example 1, except that instead of 40 g of the fiber there are added 15 g (60% by mass) of polyvinylalcohol fiber containing a phenothiazine dyestuff, in particular toluidine blue. Curing is carried out for 30 minutes at a temperature of 100° C.

The thus-produced material comprises a redoxite with an oxidation-reduction capacity of 1.3 mg-equiv/g. The apparent density of the material is equal to 120 kg/m³ and remains unchanged during operation.

EXAMPLE 20

Porous reactive material containing 20% foamed polyvinylformal and 80% cellulose-regenerated oxidation-reduction fibers with phenothiazine dyestuff is prepared.

The procedure of manufacture is similar to that described in Example 1, except that instead of 40 g of the fiber there are added 40 g (80% by mass) of cellulose-regenerated fibers containing phenothiazine dyestuff. In addition, there are also added 2% by mass of hydroquinone in the form of a 10% aqueous solution.

The thus-produced material comprises a redoxite with an oxidation-reduction capacity of 2.9 mg-equiv/g. The apparent density of the material constituting 110 kg/m³ remains unchanged during operation.

EXAMPLE 21

Porous reactive material containing 30% foamed polyvinylformal and 70% cellulose-regenerated oxidation-reduction fibers with sulphohydryl groups is prepared.

The process of manufacture is similar to that of Example 1, except that instead of 40 g of the fiber there are added 23.3 g (70% by mass) of cellulose-regenerated fibers containing sulphohydryl groups. Curing is conducted at a temperature of 30° C. for 20 hours.

The thus-produced material comprises a sulphohydryl redoxite and has an oxidation-reduction capacity of 5.1–5.2 mg-equiv/g as measured relative to a 0.1 N solution of silver nitrite. The coefficient of utilization of redox groups for 10 minutes is 42%. The apparent density of the material is equal to 120–130 kg/m³ and remains unchanged during operation.

EXAMPLE 22

Porous reactive material containing 50% foamed polyurethane and 50% polyvinylalcohol oxidation-reduction fibers with graft polymethylenepyrocatechol chains is prepared.

The foaming composition consists of (parts by mass): polyester (such as polyethyleneadipate or polypropyleneoxide, or a copolymer of tetrahydrofuran and propylene oxide) dispersed with oxidation-reduction polyvinylalcohol fibers with graft polymethylenepyrocatechol with the fiber cut to lengths of 4–5 mm (6.84 g—34.2% by mass); toluylenediisocyanate (in the form of mixtures of two isomers 2,4- and 2,6- in the ratio of 65/35 or 80/20–2.67 g—13.4% by mass) of an activator mixture containing a surfactant—0.32 g (1.6% by mass), a catalyst-dimethylaniline—0.1 (0.5% by mass), water—0.07 (0.3% by mass), paraffin oil—0.01 (0.05% by mass).

The polyester is thoroughly blended for 1–2 minutes in a high-speed mixer (65–100 r.p.m.) with finely divided oxidation-reduction polyvinylalcohol fiber with graft polymethylene pyrocatechol—10 g (50% by mass). The other components of the composition ae then added thereto, intermixed and poured into a mold, wherein foaming is effected. Afterwards, the material is washed and dried.

The thus-produced material comprises a redoxite with an oxidation-reduction capacity of 3.4 mg-equiv/g. The coefficient of utilization of the redox groups for 10 minutes is 64%.

After 10 cycles of operation (reduction-oxidation) the capacity is decreased by 13% as compared to the initial value. The apparent density of the material constituting 200–220 kg/m³ remains unchanged during operation.

EXAMPLE 23

Porous reactive material consisting of 50% foamed polyurethane and 50% polyvinylalcohol oxidation-reduction fibers with sulphohydryl groups is prepared.

The procedure of manufacture is similar to that described in Example 22, except that use is made of 10 g (50% by mass) of polyvinylalcohol fiber with sulphohydryl groups.

The thus-produced material is a sulphohydryl redoxite having an oxidation-reduction capacity relative to a 0.1 N solution of silver nitrate of 3.4–3.5 mg-equiv/g. The apparent density of the material is equal to 240–250 kg/m³ and remains unchanged during operation.

EXAMPLE 24

Porous reactive material containing 50% foamed polyurethane and 50% polyvinylalcohol metal-containing oxidation-reduction fibers is prepared.

The process of manufacture is similar to that of Example 22, except that use is made of 10 g (50% by mass) of polyacrylonitrile fiber containing ions or iron (III).

The material after reduction of the iron ions has an oxidation-reduction capacity of 2.5–2.6 mg-equiv/g. The apparent density of the material is equal to 260 kg/m³ and remains unchanged during operation.

EXAMPLE 26

Porous reactive material containing 50% foamed polyurethane and 50% cellulose-regenerated metal-containing oxidation-reduction fibers is prepared.

The process for the manufacture of the material is similar to that of Example 22, except that use is made of 10 g (50% by mass) of cellulose-regenerated fibers containing antimony ions (V).

The resulting material after reduction of antimony ions has an oxidation-reduction capacity of 2.5–2.7 mg-equiv/g. The apparent density of the material constituting 240 kg/m³ remains unchanged during operation.

EXAMPLE 27

Porous reactive material containing 30% foamed polyvinylformal and 70% cellulose-regenerated metal-containing oxidation-reduction fibers is prepared.

The process for producing the material is similar to that described in Example 1, except that instead of 40 g of the fiber, 23.3 g (70% by mass) of cellulose-regenerated fiber containing copper (II) ions are used.

The resulting material after reduction of copper ions has an oxidation-reduction capacity of 4.9–5.1 mg-equiv/g. The coefficient of utilization of the redox groups for 10 minutes is 35%. The apparent density of the material equal to 150 kg/m³ remains unchanged during operation.

EXAMPLE 28

Porous reactive material containing 40% foamed polyvinylformal and 60% polyacrylonitrile metal-containing oxidation-reduction fibers is prepared.

The procedure of manufacture of the material is similar to that described in Example 1, except that instead of 40 g of fibers use is made of 15 g (60% by mass) of polyacrylonitrile fibers containing ions of copper (II).

The resulting material after reduction of copper ions has an oxidation-reduction capacity of 5.1–5.3 mg-equiv/g.

EXAMPLE 29

Porous reactive material containing 80% foamed polyvinylformal and 20% polyacrylonitrile metal-containing oxidation-reduction fibers is prepared.

The process for producing the material is similar to that described in Example 1, except that instead of 40 g of the fibers use is made of 2.5 g (20% by mass) of polyacrylonitrile fibers containing bismuth (V) ions.

The resulting material after reduction of bismuth ions has an oxidation-reduction capacity of 0.8–0.9 mg-equiv/g. The apparent density of the material is equal to 80–90 kg/m³ and remains unchanged during operation.

What is claimed is:

1. A porous open-cell filled reactive material comprising a polymeric matrix selected from the group consisting of foamed polyvinylformal, foamed polyurethane, and a reactive filler consisting of finely divided reactive oxidation-reduction fibers in an amount of from 10 to 80% by mass of the final material, wherein the oxidation-reduction fibers are selected from the group consisting of polyvinyl alcohol, polyacrylonitrile, cellulose-regenerated and acetate-cellulose fibers with covalently bonded oxidizing-reducing agents selected from the group consisting of polyhydric phenols, anthraquinones, naphthaquinones, oligomeric condensation products thereof with aldehydes, phenothiazine dyestuffs, and compounds having sulphohydryl groups.

2. A porous open-cell filled reactive material as claimed in claim 1, wherein the content of reactive fibers is within the range of from 50 to 70% by mass of the final material.

3. A porous open-cell filled reactive material as claimed in any one of claims 1 or 2, wherein the oxidation-reduction fibers are selected from the group consisting of metal-containing fibers based on ion-exchange polymers of polyvinyl alcohol, cellulose-regenerated polymers, and polyacrylates.

4. A process for producing a porous open-cell filled reactive material as claimed in claim 1, comprising mixing a polymer solution, formalin, a surfactant and an acid curing catalyst with finely divided fibers, foaming the reaction mass and maintaining it at a temperature from about 20° to 100° C. for about 1 hour to 50 hours; and wherein during mixing and foaming said reaction mass, is contacted with 0.2 to 30% by mass of the polymer content, of compounds selected from the group consisting of polyhydric phenols capable of oxidation-reduction transformations, and oligomeric products of condensation of polyhydric phenols with aldehydes.

5. A process for producing a porous open-cell filled reactive material as claimed in claim 4, wherein the polyhydric phenols are selected from the group consisting of hydroquinone, pyrocatechol, pyrogallol, and mixtures thereof with resorcinol, and the oligomeric products of condensation of said phenols with aldehydes are made of novolac resins based on hydroquinone and pyrocatechol with formaldehyde.

* * * * *